United States Patent
Hanhikorpi et al.

(10) Patent No.: US 7,971,336 B2
(45) Date of Patent: Jul. 5, 2011

(54) METHOD FOR MANUFACTURING PRODUCTS COMPRISING TRANSPONDERS

(75) Inventors: Marko Hanhikorpi, Pirkkala (FI); Lari Kytola, Laukaa (FI); Jarkko Miettinen, Ylöjärui (FI); Matti Ritamaki, Nokia (FI); Juha Ikonen, Nokia (FI); Heikki Ahokas, Tempere (FI)

(73) Assignee: Confidex OY, Tampere (FI)

( * ) Notice: Subject to any disclaimer, the term of this patent is extended or adjusted under 35 U.S.C. 154(b) by 101 days.

(21) Appl. No.: 12/227,237

(22) PCT Filed: May 12, 2006

(86) PCT No.: PCT/FI2006/050190
§ 371 (c)(1),
(2), (4) Date: Nov. 12, 2008

(87) PCT Pub. No.: WO2007/132053
PCT Pub. Date: Nov. 22, 2007

(65) Prior Publication Data
US 2009/0249611 A1 Oct. 8, 2009

(51) Int. Cl.
*H01S 4/00* (2006.01)
*H01Q 13/00* (2006.01)
(52) U.S. Cl. ............. 29/592.1; 29/601; 29/600; 29/832; 340/572.7; 343/700 MS
(58) Field of Classification Search .................... 29/600, 29/601; 343/700 MS, 786; 156/256, 277; 340/572.7
See application file for complete search history.

(56) References Cited

U.S. PATENT DOCUMENTS

| | | | |
|---|---|---|---|
| 5,305,008 A | 4/1994 | Turner et al. | |
| 5,973,600 A * | 10/1999 | Mosher, Jr. | 340/572.8 |
| 6,019,865 A * | 2/2000 | Palmer et al. | 156/265 |
| 6,181,287 B1 | 1/2001 | Beigel | |
| 7,492,164 B2 * | 2/2009 | Hanhikorpi et al. | 324/633 |
| 7,707,706 B2 * | 5/2010 | Koch et al. | 29/600 |
| 7,908,738 B2 * | 3/2011 | Forster et al. | 29/600 |
| 2003/0136503 A1 | 7/2003 | Green et al. | |
| 2004/0194876 A1 | 10/2004 | Overmeyer et al. | |
| 2004/0215350 A1 * | 10/2004 | Roesner | 700/1 |
| 2006/0038687 A1 | 2/2006 | White et al. | |
| 2009/0249611 A1 * | 10/2009 | Hanhikorpi et al. | 29/601 |

FOREIGN PATENT DOCUMENTS
WO  WO 02/49093 A  6/2002
WO  WO 2004/088571 A2  10/2004

OTHER PUBLICATIONS
International Search Report for PCT/FI2006/050190.
* cited by examiner

*Primary Examiner* — Minh Trinh
(74) *Attorney, Agent, or Firm* — John Moran, Esq.; Holland & Knight LLP (57) ABSTRACT

The present invention relates to a method for manufacturing products comprising transponders. The method comprises introducing a web comprising on its surface sequential structural modules comprising an impedance matching element and an integrated circuit electrically connected to the impedance matching element, the structural modules having a first distance between each other; cutting the web in such a manner that the sequential structural modules are separated from each other; attaching the structural modules to a product substrate, the sequential structural modules having a second distance between each other, the second distance being longer than the first distance; and attaching the impedance matching elements to antennas, the impedance matching elements and the antennas forming an electrical connection.

15 Claims, 7 Drawing Sheets

METHOD FOR MANUFACTURING PRODUCTS COMPRISING TRANSPONDERS

FIELD OF THE INVENTION

The present invention relates to a method for manufacturing products comprising transponders, each transponder comprising a structural module and an antenna. The structural module comprises an impedance matching element and an integrated circuit on a chip. The antenna may be capacitively coupled to the impedance matching element or it may have an ohmic contact with the impedance matching element. The products in which the transponder can be integrated are usually packaging materials, packages, or labels.

BACKGROUND OF THE INVENTION

The greatest hurdle still remaining in the adoption of RFID technology is its functionality and cost, especially the cost and the performance of transponders. The applications are very fragmented and require application-specific transponders, but this increases significantly the costs for the manufacture of transponders of the inlay type, as the tags cannot be tailored for each end use.

The RFID market development is currently in a phase of planning to start high volume manufacturing. When mass production is adopted, customers expect to have ultra low cost UHF transponders available. In order to achieve that, both fixed sizes for transponders and new ways to manufacture have to be considered. The method of manufacturing has to be designed in view of the exact end products and processes that each package or label manufacturer has, since these features are very different amongst manufacturers.

The basic cost of manufacturing comes from following sections: Raw material cost, antenna manufacturing cost, integrated circuit (IC) assembly cost, converting cost, overall process yields and process efficiency, labour needs per produced transponders and complexity of the management of the process, and equipment costs.

In order to meet the aims for growing business, the manufacturing process has to be not only cost efficient and reliable but also capable of producing tags and labels with a sufficient number of units per hour. The products have to be mass tailored. In roll-to-roll manufacturing, this means that machine setup times have to be short and achievable yields high, irrespective of the product to be produced.

The RFID tag supplier needs to be flexible to make customer-specific tags either because of size requirements or because of materials needed or the RF-performance. As RFID tagging will be shifted from the pallet level to the case and item levels, new challenges for tags are faced: package design restrictions, proximity to wider variety of intermediate materials, and the recycling of packages. Tags will be produced more to fit the purpose.

The retail supply chain is facing pressure to continuously develop consumer driven operations. Retailers expect from their producers replenishment in store shelves based on consumption. Delivery times are measured in hours, not days. This pressure is presently shifting from producers to package and label suppliers, to avoid capital expenses of buffer stocks. This development will not accept conventional made-to-order operations. Converters will have to integrate with their customers and have lean operations. Customer orientation is a prerequisite.

Until now, attempts have been made to minimize costs related to transponder manufacturing mainly by developing various types of low-cost structural module manufacturing concepts and minimizing antenna sizes without really considering the overall value chain, the process flows of final products, the cost of materials, the achievable yields, and the overall equipment capital expenditure.

The assembly of the integrated circuits on the chips is generally considered to be the bottleneck and the highest cost factor in transponder manufacturing. Unfortunately, the overall bottleneck and cost problem of transponder manufacturing is not solved by increasing the units per hour of IC assembly. Also, by partial optimization and disregarding the overall chain of manufacturing, the most severe problems are normally just postponed to the next step in the production chain. This is the case with the structural module products of prior art. The structural modules are of a low quality and of a low yield (all ICs, including those of poor quality, are assembled from wafers, and the ICs are not sorted while picked from the wafer), expensive to assemble into final inlays, the structural module assembly processes are unreliable, and these inlays still require further converting into labels or dispensing if one wants to integrate them in packages. Further, no process has advanced to the industrial level.

All of the IC suppliers planning to offer packaged IC's in a structural module format focus on minimizing the size of the structural module to make the structural module as inexpensive as possible (less structural module substrate consumption and cost, higher packaging density in IC assembly). The cost saving is marginal, and in this way the costs are transferred to later processes. Size minimisation means, in practice, that the structural modules do not include any conjugate matching element to keep the structural module size smaller which, in turn, means that the structural modules have to be connected to the antenna by an ohmic contact. When the antenna structure includes the matching element, a simple strip will no longer function as an antenna, but more advanced and application-specific antenna structures have to be used.

There are a few advanced transponders on the market. Examples of transponders with a capacitively coupled small tag antenna and a larger booster antenna include the Tagsys Kernel tag and the KSW Taurus dual antenna tags. The Tagsys Kernel tag is intended to solve the problem of tagging on the item level. A small booster tag is applied to a primary package which couples to a larger antenna printed on a secondary package. The Taurus provides the tags with better short-range read-write performance.

Another way to do IC assembly is to assemble the IC directly on the transponder antenna, either in a wide web or narrow web format. A problem here is that the packaging density of ICs on the web is relatively low, which slows down both the pick and place and final bond operations. Also, to form the final label, the inlay manufacturer must first make the inlay in several processing steps, and then the label converter must convert it to a label. This requires several unwindings and rewindings, reduces the yields, requires expensive equipment, and reduces the number of units per hour of printing lines, because an electrical outgoing inspection cannot be carried out for webs running at very high speeds.

Publication U.S. Pat. No. 5,305,008 discloses a transponder system. The system comprises a signal responding label including a first antenna for receiving an interrogation signal and for scattering a reply signal, an impedance connected to the first antenna, means for generating the reply signal and means for varying the impedance connected to the first antenna in accordance with the reply signal; and an interrogator comprising a second antenna for transmitting an interrogation signal and for receiving the reply signal, a transmitter connected to the second antenna and including a generator of pulsed radio frequency energy, means for separating the reply signal from the transmitted signal, a receiver connected to the second antenna and means within the receiver for detecting and decoding the reply signal.

Publication U.S. Pat. No. 6,181,287 discloses an RFID circuit for incorporation in an identification device which includes a polymeric substrate, the circuit being formed or integrally connected with said substrate, whereby said substrate becomes a component of the RFID circuit. An embodiment of the circuit includes circuit components printed or attached to the opposite sides of said substrate utilizing the resistance of said substrate in a reactive or inductive circuit.

SUMMARY OF THE INVENTION

The novel manufacturing method has many advantages. It improves the cost efficiency of UHF RFID transponder manufacturing remarkably by solving the problem of how to manufacture RFID tags in a more integrated way while manufacturing the primary product in which tag is to be integrated (for example package or smart labels). With this invention, there is no need to manufacture an intermediate product, such as an inlay. A company manufacturing the end product can manufacture and tailor a transponder to meet specific application needs while manufacturing the whole smart label or package. The invention also solves the problem of how to include structural modules in packages and smart labels in an inexpensive and reliable way, and how to make a really low-cost antenna online with the IC assembly and the transponder conversion process without needing to consider expensive and complicated conductive ink printing for large antenna areas. The antenna part can be integrated in the label stock, for example, as a metal strip.

This invention enables the minimization of both process equipment and material cost, since tag manufacturing is integrated directly in the package manufacturing or converting process, and since no additional etched or printed metallic antenna and PET/paper substrate will be needed. Only a strip of low-cost metal foil is used instead. Its cost may easily be only about 1/10 of the cost of an etched antenna on PET substrate or a silver printed antenna on paper or PET substrate.

One of the key findings is the fact that a UHF transponder can be manufactured without an expensive antenna substrate and material, with an ultra low cost aluminium foil strip or with a printed antenna strip. The transponder is still of very high quality, as all the "intelligence" (i.e. conjugate impedance matching, high quality IC assembly) of the transponder is in a very small size structural module. A larger size aluminum foil strip only functions as an RF energy harvesting antenna element, but not as a matching element to IC. In transponders of prior art, the whole tag is made of an expensive material, since IC is assembled on an etched or printed antenna. With UHF frequencies, the structural module can be connected to the antenna strip capacitively without any need for extremely expensive and unreliable ohmic contacts between the antenna and the structural module.

Another key invention is how to combine the structural module assembly, the placement of the structural module onto the antenna substrate and the antenna manufacturing online, all in one process.

When the final product is a smart label, a so-called "upscaling process" is used to assemble a row of structural modules to a row of metal foil strips. This upscaling is performed online with the IC assembly with no extra handling cost and with an inexpensive technical solution. RFID tickets can also be manufactured by this method.

When the final product is a package, a tag manufactured by the upscaling process can be dispensed into the package. Another, more likely way is that the assembled structural module, manufactured in advance, is dispensed and glued into the package and an aluminum foil is laminated onto the package, on top of or underneath the structural module to operate as an RF energy harvesting antenna (far field antenna).

Another key finding is that the structural module can be electrically designed in such a way that only a strip of metal works as a antenna and that it works with a capacitive coupling with the impedance matching element of the structural module. The cost of the structural module assembly process is thus reduced dramatically. When no ohmic contact is needed between the structural module and the antenna, the process becomes significantly simpler and the quality of the product becomes much better since bending, temperature or humidity stress, etc do not change the impedance of the structural module and the antenna connection in the same way as if they were connected through the conductive route. The good electrical designing of the structural module will assure that one structural module and one antenna can be made to work in all regions or in all applications. The structural module/antenna assembly tolerates great variations in the placing.

The technology also meets the requirements which should be a precondition to any technology: it is standardizable in industrial scale, it gives high yields for its function, there is capability to scale it up in a flexible way, and it is modifiable enough to meet fragmented needs of a large variety of application. Further, the technology is compatible with the current label/package manufacturing infrastructure and equipment.

The manufacturing method is based on roll-to-roll operations. At first, sequential impedance matching elements are formed on a surface of a web. The impedance matching elements create a conjugate matching between an integrated circuit on a chip and an antenna. The impedance matching elements can be manufactured, for example, by printing, etching, die-cutting, vaporizing, sputtering or by some other additive technique on the surface of the web. The impedance matching element comprises an electrically conductive material, such as copper, aluminium, or silver. The web is typically a plastic web, such as a polyester web.

In the next process phase, the integrated circuit on the chip is attached to every impedance matching element, thus forming structural modules. The chip can be a silicon chip or a polymer chip. There are several possibilities to attach the chip to the antenna, for example by using solder paste, isotropically conductive adhesive, or anisotropically conductive adhesive. The adhesive can be a film or a fluid adhesive which will be dried and/or cured. The aim is that an electrical connection is formed between the impedance matching element and the chip.

It is possible that the polymer chip is printed on a substrate at the same time when the impedance matching element is printed on the substrate. Thus a complete structural module can be formed in a single process step on the same production line. The structural module can be connected capacitively to the antenna, or an ohmic contact can be formed by using for example an electrically conductive paste.

After the structural modules comprising the impedance matching elements and the chips have been formed, the structural modules are tested. Next, the web is cut so that the individual structural modules are separated from each other, and structural modules which do not function properly are removed. The structural modules are attached to a product substrate which can be a plastic web, a paper web, a cardboard web, or ready packages. The individual structural modules are placed on the surface of the product substrate so that their mutual distance on the substrate is longer than their mutual distance on the original web. The structural modules are attached to the substrate adhesively or some other way.

The impedance matching elements of the structural modules are attached to the antennas so that the impedance matching elements and the antennas form a capacitive or an ohmic contact. The antennas are produced roughly as to their material and shape. It is also possible that an ohmic contact is formed. For example, the antenna can be a strip of a metallic foil, such as an aluminium foil. It may be cut from the metallic foil, or it may be manufactured to a precise size e.g. by reducing a pattern from suitable raw materials, or it may be made by other additive antenna manufacturing methods.

The antenna strip may be an aluminium foil having a thickness of 9-18 μm. It can be attached with a pressure-sensitive adhesive on top of the paper substrate and the structural module. The antenna strip can also be printed directly on the paper substrate by any suitable printing technique, such as flexo, screen, or offset. The antenna strip can also be prelaminated onto a label stock while the label stock is manufactured before attaching the structural module on the label paper substrate. The antenna strip can also be a die-cut blank manufactured in advance. The blank is then dispensed in the same process in which the structural module is dispensed.

BRIEF DESCRIPTION OF THE DRAWINGS

A detailed description will now follow with reference to the accompanying drawings wherein.

DETAILED DESCRIPTION OF THE INVENTION

A transponder integrated in a label may comprise, for example, the following elements: a paper substrate, a structural module comprising an integrated circuit on a chip, and a impedance matching element, and an antenna strip, i.e. a antenna. The paper substrate may have a thickness of 50 to 80 μm and it may be coated with an acrylic pressure-sensitive or hot-melt adhesive. The size of the structural module may be for example 5 to 20 mm×5 to 20 mm. The substrate of the structural module may consist of PET but it can also be paper-based. When the substrate is paper-based, the conductors, for example the impedance matching element, can be printed by flexo, offset, screen or any other suitable printing technique. As one can understand, the size of the structural module and the thickness of the paper substrate can naturally be different from what has been described above.

A package transponder can either be used as the above-mentioned transponder or the package surface can act as a substrate. The structural module is dispensed and attached to the substrate. The antenna strip can be laminated onto the package surface while manufacturing the package raw material or while dispensing the structural module. The antenna strip can also be printed, or it can be printed during the manufacturing of the package raw material. The antenna strip can also be prelaminated and die-cut and then dispensed onto the package surface.

The present invention comprises several important elements: the structure of the transponder, the electrical design of the structural module, the electrical testing of the structural module, the integrated label type of transponder manufacturing, the integrated package transponder manufacturing process, the discrete label manufacturing process for label converting, and the discrete manufacturing process for package manufacturing.

The transponder comprises a label substrate or a package substrate, an adhesive, a structural module, and an electrically conductive strip, i.e. a antenna. The label substrate can consist of paper or synthetic film. The adhesive may be a pressure sensitive adhesive. The substrate of the structural module is typically of polymeric material. The antenna can be a printed conductor or a laminated metal foil or a strip of for example aluminium or copper.

If the impedance matching element of the structural module and the antenna are coupled together capacitively, it makes possible to manufacture the transponder by lamination (excluding the IC assembly on antenna), since the antenna and the structural module do not need to be connected by ohmic connection. The transponder structure is characterized by the fact that only a strip of metal is used as an antenna and the structural module contains all the matching elements required to electrically match the IC and the antenna.

It is also possible that a polymer chip is used instead of the silicon chip. The polymer chip is printed on the substrate and at the same time it is also possible to print the impedance matching element. The polymer chip can be printed by using a semiconducting polymeric material.

The structural module is electrically designed in such a way that it functions without an ohmic contact and with a strip foil antenna. The structural module is also designed in such a way that it can be considered to be universal. It is also easy to integrate in the label or package substrate. With the same structural module, by modifying the structural module with respect to the antenna position and the IC position, all applications and frequency ranges can be covered by the same structural module enabling a truly "on demand" manufacturing.

The electrical testing of the structural module can be made by contact or contactless methods. In connection with the testing, those structural modules which do not function properly are removed.

The integrated label type of the transponder manufacturing process comprises: the assembly of the structural module, the lamination of the structural module onto a paper or film substrate, and the lamination or printing of the antenna strip on top of the paper substrate and the structural module. The order of the structural module and the antenna may also be the opposite. The structural module is capacitively coupled to the antenna.

The integrated package transponder manufacturing process comprises: the assembly of the structural module, the lamination of the structural module onto the package substrate, the printing of the antenna or the lamination of the strip onto the package substrate, and the cutting of the strip to the correct electrical length (if needed). It is also possible that the strip is first cut to the correct electrical length and then laminated onto the package substrate.

The discrete manufacturing process for label converting comprises: 1) Structural module manufacturing in separate process, 2) antenna printing/strip lamination to label substrate either in same process step with structural module manufacturing or prior to it, while raw material for labels stock is manufactured, (3) label printing) and 4) structural module dispensing to label substrate. Also it can be done such a way that instead of step 2, blank or printed label is manufactured where antenna strip is embedded, either by laminating metal strip or printing and dispensing this "antenna label" before or after step 4, structural module dispensing.

The discrete manufacturing process for package manufacturing comprises: 1) the manufacture of the structural module in a separate process, 2) the printing of the antenna or the lamination of the strip onto the package substrate either in same process step with the manufacture of the structural module or prior to it, while the raw material for packages is manufactured, and 3) the assembly of the structural module onto the package substrate. Also, instead of step 2, a blank or printed label may be manufactured where the antenna strip is embedded, either by laminating a metal strip or by printing and dispensing this "antenna label" before or after step 4, the dispensing of the structural module onto package substrate.

To make the structural module solution with the lowest overall cost, the key issue with regard to the tag structure based on this innovation is to design the structural module part electrically correctly. The following boundary conditions have to be met:

The structural module has to comprise sufficient lumped inductance (impedance matching element) on its structure which acts as an impedance matching for IC input impedance (capacitance). This matching element has to produce a wide band response. When this occurs, the antenna part is only harvesting RF energy and does not need to have any specific geometry, as long as its electrical length is close to one half of the wavelength of the carrier frequency used. Consequently, a laminated or printed simple strip will be sufficient. In practice, in different structural module designs, the antenna strip may be for example between 5 to 20 mm wide and still function well at the UHF band.

The capacitive plates of the structural modules and the antenna produce a sufficiently high capacitance to provide a sufficient tolerance for the structural modules dispensing to the substrate. The capacitive plates enable robust alignment of the structural modules and the antenna.

The assembly of the IC is performed in a high quality process, such as flip chip. Also another assembly than flip-chip can be used for the IC in this innovation (for example Alien FSA, Matrics PICA, other polymer substrate based structural modules, etc).

As a result of good structural module designing, it is possible to build in a very small structural module size all the elements of a high quality transponder (good IC assembly, correct and wide band impedance matching for the input impedance of antenna, alignmentwise robust capacitive element to antenna element, etc.), without this "expensive" part being a large part of the overall transponder size (for example only 1/10). This saves a lot of cost without jeopardizing the overall transponder performance. The manufacturing method described above is very suitable for the transponder structure described.

Figure 1:
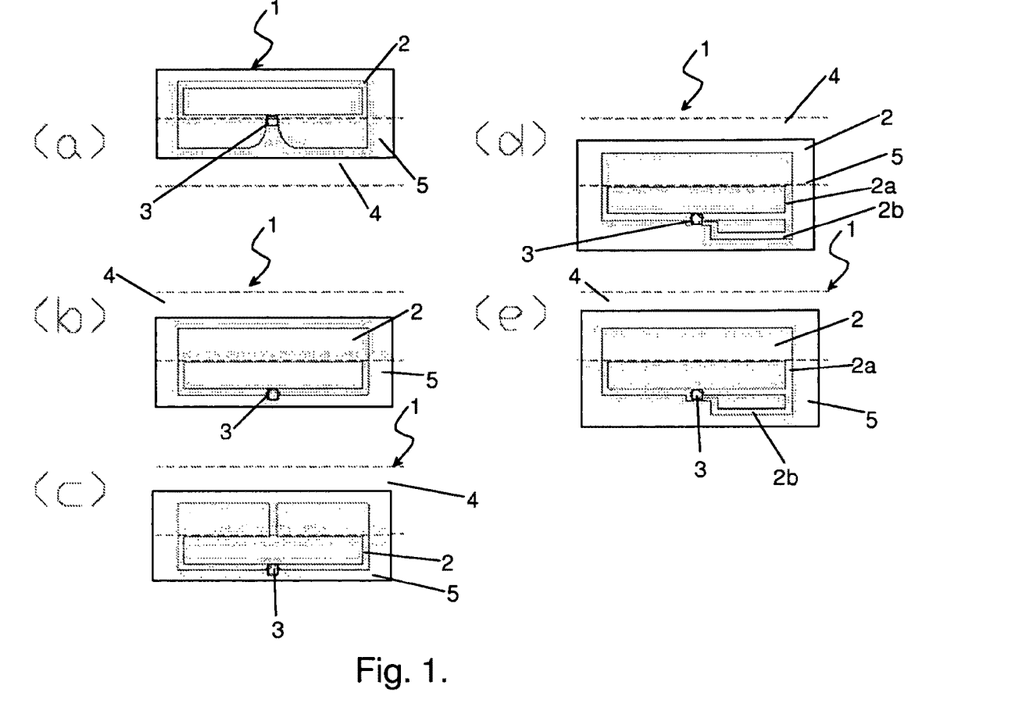
FIG. 1 shows alternative structural modules from above.

Examples about different structural module layouts are shown in FIG. 1. A good capacitive coupling is obtained with large overlapping metal areas of the impedance matching element 2 of the structural module 1 and the metallization of the antenna 4 (dashed lines). The integrated circuit on the chip is denoted by the number 3. The large overlapping metal areas cause less losses and are more robust for manufacturing variation. The structural module layouts (a) and (b) are suitable for most applications. The integrated circuit on the chip 3 is on top of the antenna metallization in the alternative (a). The chip 3 can also be on the surface of the substrate 5 of the structural module, and the capacitive coupling element may be on the other side of the structural module substrate. An alternative (c) is suitable for such chip types which do not have internal DC block capacitors. In alternatives (d) and (e) the impedance matching element 2 comprises a primary loop 2a and a secondary loop 2b. The size of the inductive loop can be changed by rotating the chip as in alternative (d) or (e). A ground pad is provided on the left hand side. Only the larger loop is activated in the alternative (d). If the chip is rotated clockwise 90 degrees, the inductance of the structural module is increased, because the secondary loop will also be activated.

Figure 2A:
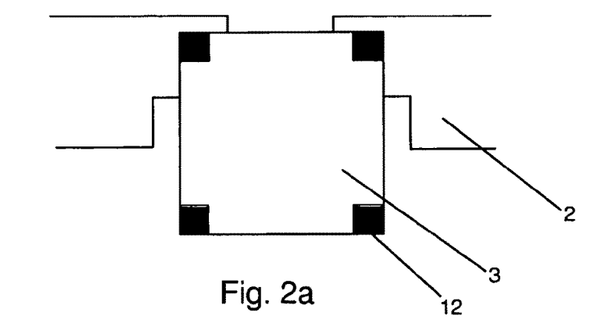
FIG. 2 shows magnifications of FIG. 1.

FIG. 2 shows magnifications related to FIG. 1. In FIG. 2 the chip 3 is illustrated as being transparent in order to show bumps 12 through which an electrical connection is formed between the impedance matching element 2 and the chip 3. FIG. 2a shows a possible connection used in connection with the alternatives (a), (b), or (c) shown in FIG. 1. The chip 3 comprises four bumps 12 from which two are idle and two of them form a connection between the impedance matching element 2 and the chip 3.

Figure 2B:
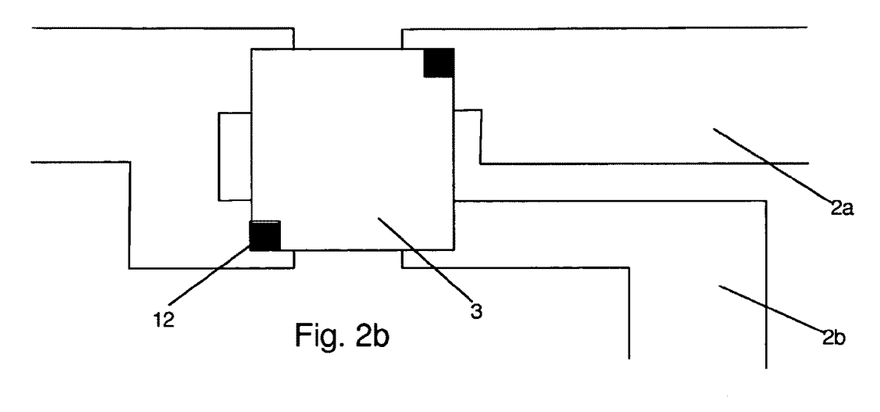

FIG. 2b corresponds to the alternative (d) in FIG. 1. The chip 3 comprises two bumps 12 through which an electrical connection is formed between the primary loop 2a of the impedance matching element 2 and the chip 3.

Figure 2C:
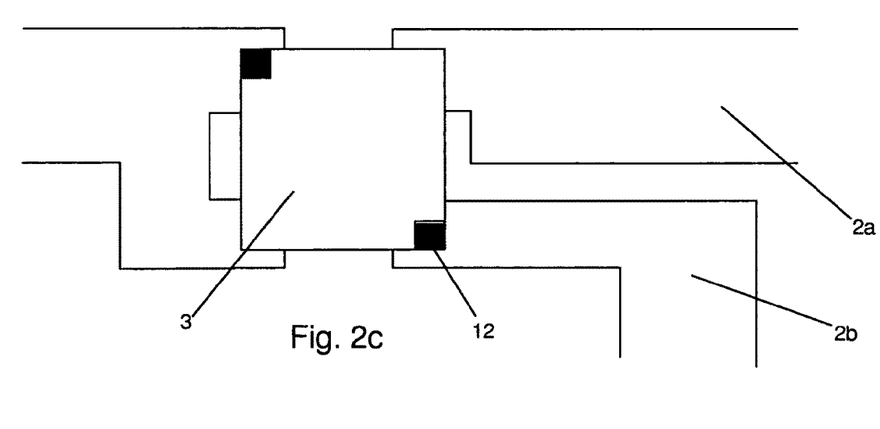

FIG. 2c corresponds to the alternative (e) in FIG. 1. The chip 3 comprises two bumps 12 through which an electrical connection is formed between the secondary loop 2b of the impedance matching element 2 and the chip 3.

As can be seen from FIGS. 2b and 2c, it is easy to vary the product just by rotating the chip 3. Hence, the above-described system is an important part in creating a flexible and rapid manufacturing method.

It is possible that there are more loops than just the primary loop and the secondary loop. Each loop is activated by the same principle as that described above.

The capacitive coupling between the impedance matching element and the structural module is based on the equations below. From the equations we can see that the higher the capacitance between the antenna and the structural module is, the less it creates impedance (=losses) between the antenna and the structural module and thereby affects the transponder performance.

The capacitance of the structural module ("strap" refers to the structural module):

$$C_{strap} = \varepsilon \frac{A}{d} \quad (1)$$

$\varepsilon$=substrate dielectric constant
A=area of the structural module
D=intermediate dielectric thickness The reactance of the structural module:

$$Z_{strap} = 1/j2\pi f C_{strap} \quad (2)$$

f=frequency
IC, assembly and strap impedance:

$$Z_{Chip+joint+strap} = Z_{chip} + Z_{joint} + Z_{strap} = R_{chip} + jX_{chip} + R_{joint} + jX_{joint} + R_{strap} + jX_{strap} \quad (3)$$

$R_{chip}$=the resistance of the integrated circuit
$X_{chip}$=the reactance of the integrated circuit
$R_{joint}$=the resistance of the assembly
$X_{joint}$=the reactance of the assembly
$R_{strap}$=the resistance of the structural module
$X_{strap}$=the reactance of the structural module By practical experiments, it has been found that 100 pF would be more than a sufficient capacitance at 900 MHz, but even 50 pF is sufficient in practice. This equals a reactance of 1.7 ohms. With a dielectric thickness of 50 µm, an area of approximately 10 mm×10 mm will give this 50 pF value. With a structural module size of 4 mm×9 mm, which may become an industrial standard (currently used by big IC suppliers), a structural module substrate of 12 µm will be needed.

The structural module can also be laminated on top of the antenna strip. In this case, a few microns of a pressure sensitive adhesive or a hot melt adhesive is provided between the antenna and the structural module. In this case, the capacitive elements can be rather small.

Environmental testing was carried out including testing for 168 hours at a temperature of 85° C. and a humidity of 85%, and a testing cycle in which the temperature was varied between −40° C. and 80° C. No difference was detected between the structural module based transponder and normal industrial standard direct flip-chip processed tags.

The inductance of the structural module needs to be be chosen in such a way that it will resonate with the capacitance of the IC. Complex conjugate impedance matching is typically used. The reactances cancel each other out in the equation (3). A purely resistive impedance can be easily matched with a purely resistive antenna impedance. The antenna impedance can be for instance 70 ohms for a half wavelength dipole. Another operating point can be also designed for the structural module. The impedance operating point will depend on the IC front end structure but also on the end use antenna design.

Figure 3:
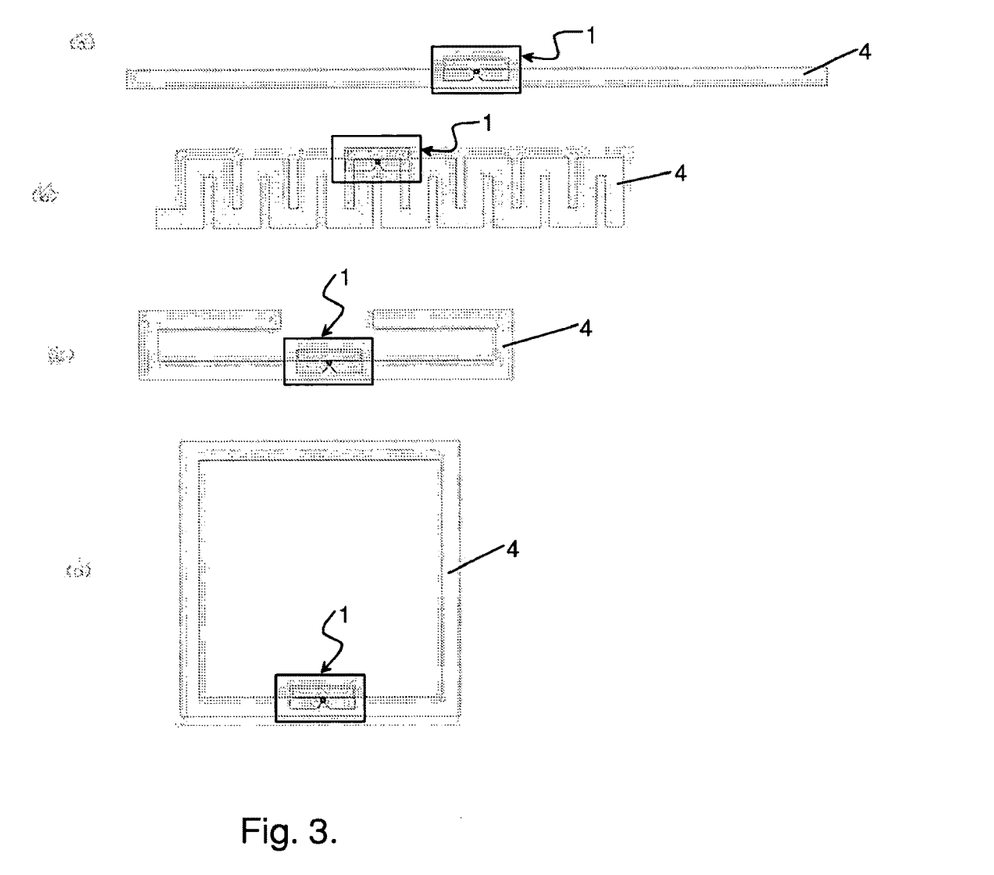
FIG. 3 shows antenna layout structures from above.

Possible antenna layout structures are shown in FIG. 3. The antenna needs to be designed in such a way that it will resonate at a desired frequency in the end use application. The reactance will then be close to zero. The physical length of the antenna may be significantly shorter that half the wavelength, if the antenna is attached on a highly detuning material, such as plastic. In the layout (a) the antenna 4 is a standard dipole antenna. The resonance frequency can be tuned with the strip length. If the physical size needs to be minimized, the antenna layouts (b), (c) or (d) should be used. A meander line is used in the layout (b). The dipole tips are bent in the layout (c). A loop antenna is used in the layout (d).

One important process step is the electrical testing. The quality of the structural module needs to be tested in production. Contactless or contact testing can be used. Direct contact testing is suitable for very small structural modules without a coupling element. The contactless method is most suitable for structural modules with an additional matching element. Functional testing needs to be performed after the IC attachment in the structural module manufacturing line but also before attaching the structural module to the antenna.

Figure 4:
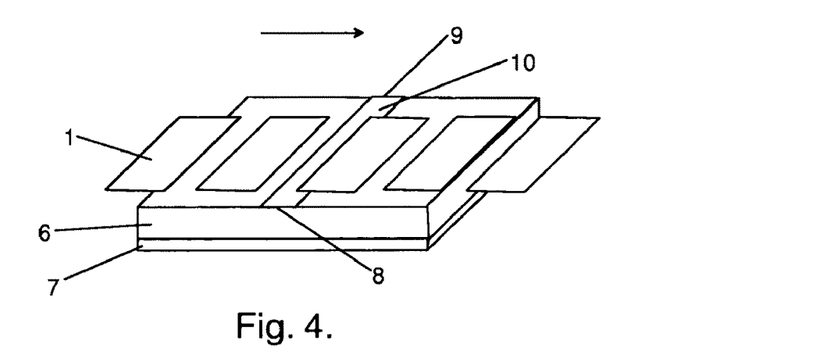
FIG. 4 shows a test system in a perspective view.

A test system is shown in FIG. 4. The test system comprises an RFID reader 8 or a tester and an antenna 10. The system also comprises a substrate 6 and a ground plane 7. The reader 8 sends commands to the chip of the structural module 1 through the antenna 10. Coupling between the structural module and the testing antenna is very important. A good coupling can be obtained with a microstrip line which acts in the same way as the antenna in the label. A standard two sided PCB can used as a tester antenna. A microstrip line needs to be properly terminated to a termination point 9 in order to get good power transfer from the reader to the structural module or vice versa. The microstrip line antenna couples to the structural module web capacitively.

Next, an integrated process for manufacturing a label based transponder will be described. Key issues in RFID manufacturing are the integration level of the equipment (=preferably the whole label product ready in one run, the raw materials being an antenna strip for the antenna or conductive ink, an integrated circuit on a chip, and paper with adhesive), the modularity of the manufacturing, and the use of an upscaling process, i.e. increasing the distance between the sequential structural modules, to join the impedance matching elements and the antennas together.

As mentioned above, the key processing cost for the manufacturing is caused by the assembly of the integrated circuit (IC). Therefore every pre-process and post process has to be designed with the IC assembly and its limitations in mind. With the structural module concept and modular manufacturing line, the usability of IC assembly lines can be optimized (small structural module→high packaging density and high throughput of the IC line) with low cost structural module assembly and converting. When the IC placement and the IC density on the structural module web are the same, irrespective of the transponder produced, no machine setups need to be performed when the product type is changed.

Upscaling refers to the following process:

The structural modules are manufactured at a certain cross-directional distance from each other (this distance will be the same cross directional distance between ready transponders in a web of parallel transponders. FIGS. 4 to 7 show the difference in IC packaging density between the structural modules or for the case if the ICs are assembled directly in the final transponder antenna size. In this example, there are 8 times more ICs on the structural module web.

A sheet of structural modules (one sheet comprises one row of structural modules, in this case, 8 pieces) is die-cut on a vacuum roller and transferred to a paper or another substrate coated with an adhesive, for example a pressure sensitive adhesive. The structural modules are tested whether they work properly, and if they are inoperative, they are removed without transferring to the substrate. The distance between the structural modules of a sheet on the substrate where it is laminated, will be defined by the speed difference between the vacuum roller and the substrate, on which the structural modules sheet is laminated.

Figure 5:
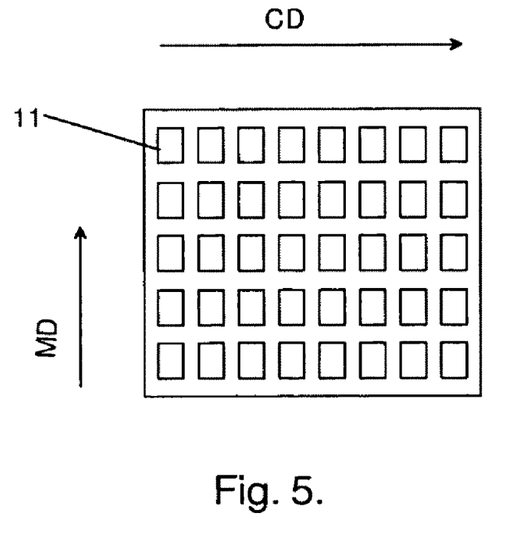
FIGS. 5-9 show the principle of the upscaling method.

FIG. 5 shows a structural module web. The machine direction (MD) and the cross direction (CD) are shown by arrows. FIG. 5 shows a normal transponder web. One can immediately see that the packing density of the structural module web is higher than with the normal transponders.

Figure 6:
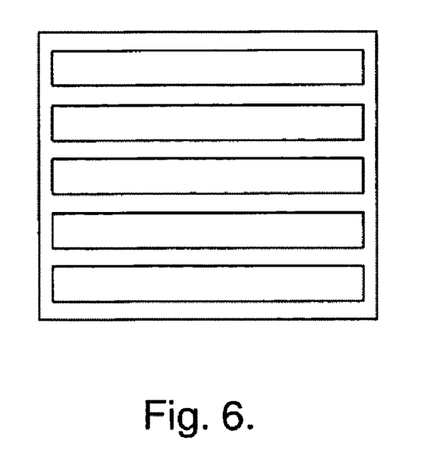

FIG. 6 illustrates the idea of the upscaling. The rows of structural modules 11 are transferred to another substrate. Thus, the distance between the sequential structural modules is increased. It is also possible to make the upscaling process such that both the machine directional distances and the cross directional distances are increased (see FIG. 9).

Figure 7:
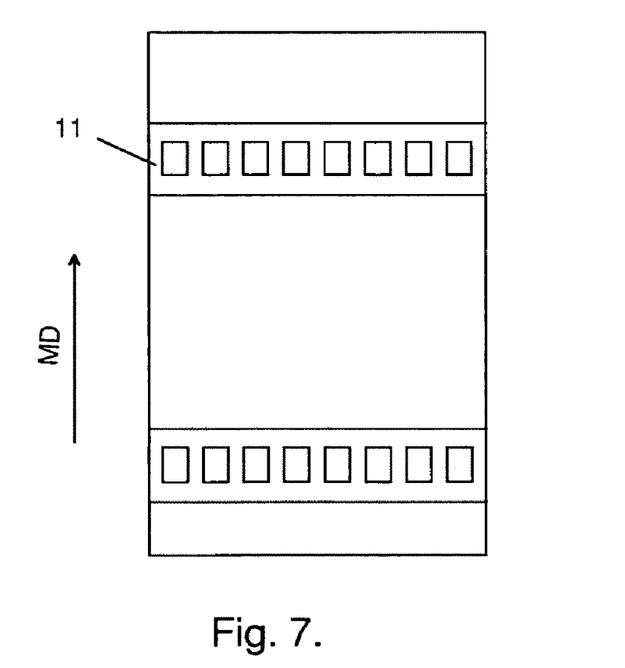
Figure 8:
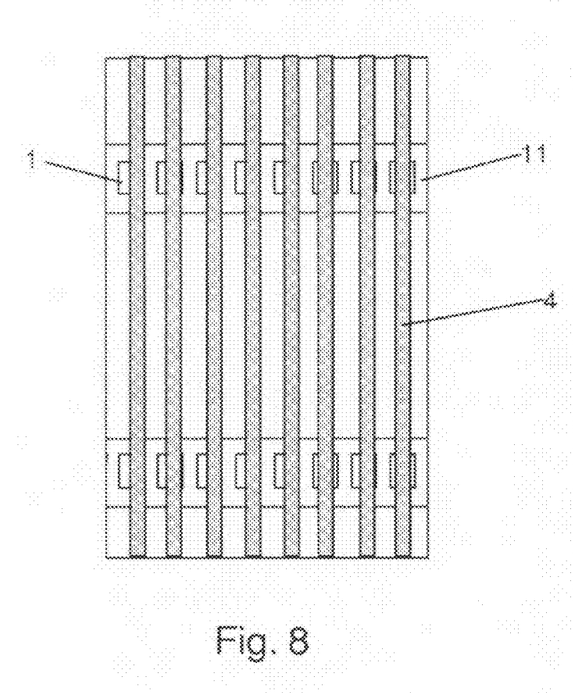

FIG. 8 shows the next step after that shown in FIG. 7. Antenna strips 4 are laminated on the structural modules 1 so that a transponder construction is formed.

Consequently, upscaling refers to increasing the machine directional (MD) distance between the structural modules of sheets from the original distance. In other words, the sequential impedance matching elements have a first distance between each other when they are formed on the surface of the web, and they have a second distance when they are separated from each other and attached to a face web, the second distance being longer than the first distance. In practice, the MD distance of structural modules sheets is, after the upscaling, the distance between the transponders.

Upscaling makes it possible to produce specific and complex (long distance in MD) large transponders, for example luggage tags, which would be extremely expensive to manufacture with prior art technologies, since they need to be very long (low packaging density of ICs, expensive antenna, since it is large).

By the above-mentioned technique, the upscaling technique, illustrated in FIGS. 5, 7 and 9, can also be used in the manufacturing of RFID tickets. The RFID tickets refer to the tickets which comprise a transponder. The transponder comprises a substrate, an antenna and an integrated circuit on a chip. The chip can be a silicon chip or a polymer chip.

The transponder is usually a high frequency transponder. The transponders are dispensed by using the upscaling method on a first web and attached to the first web by an adhesive. The distances can be increased in both the machine direction and the cross direction. After dispensing the transponders on the first web, a second web is attached to the opposite side of the transponders. Thus a ticket web comprising transponders is formed. It is also possible that the second web is omitted and the transponder is only attached to the first web. In that case the first web is preferably a paper or cardboard web which may be printed before attaching the transponder, Finally the ticket web is cut so that individual RFID tickets are formed, or the ticket web is wound to a roll, or fan-folded. When the ticket web is either wound to the roll or fan-folded, there may be perforations between the individual tickets in order to help to detach tickets.

The first and the second webs can be pre-printed or they will be printed after the transponders have been placed between them.

The next step after the upscaling is the lamination of the foil strip antenna on top of the substrate and the structural module. The antenna strip can also be printed. The adhesive with which the substrate is coated, attaches the antenna (as it has glued also the structural module) onto the substrate. See FIGS. 5 to 8.

After this, the transponders are die-cut and inspected electrically. It is also possible that additional laminations, printings, or other manufacturing steps can take place after the lamination or printing of the antenna strip.

Figure 9A:
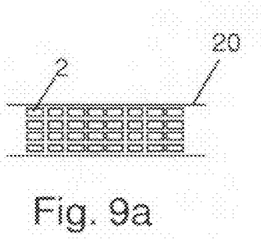
Figure 9B:
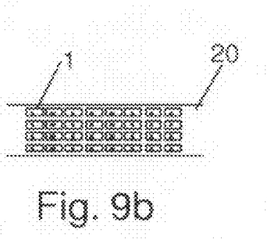
Figure 9C:
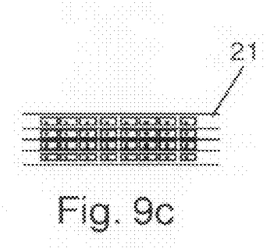
Figure 9D:
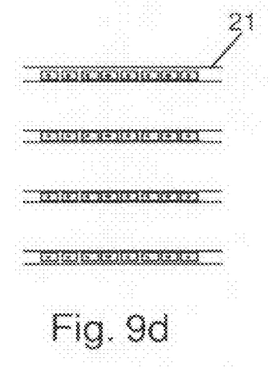
Figure 9E:
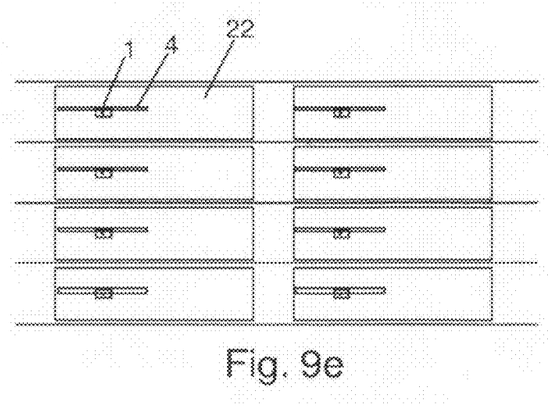

It is also possible to adjust the distance of the structural modules both in the machine direction and the cross direction. That situation is shown in FIG. 9. FIG. 9a shows a web 20 comprising impedance matching elements 2. In FIG. 9b, integrated circuits on chips are attached to the impedance matching elements and thus structural modules 1 have been formed. In FIG. 9c, the web 20 is slit into webs 21. The distance of the webs 21 (the cross direction) have been made longer in FIG. 9d. In FIG. 9e, the structural modules 1 have been separated from the webs 21 and attached to labels 22. Also antennas 4 have been attached to the labels 22.

Figure 10:
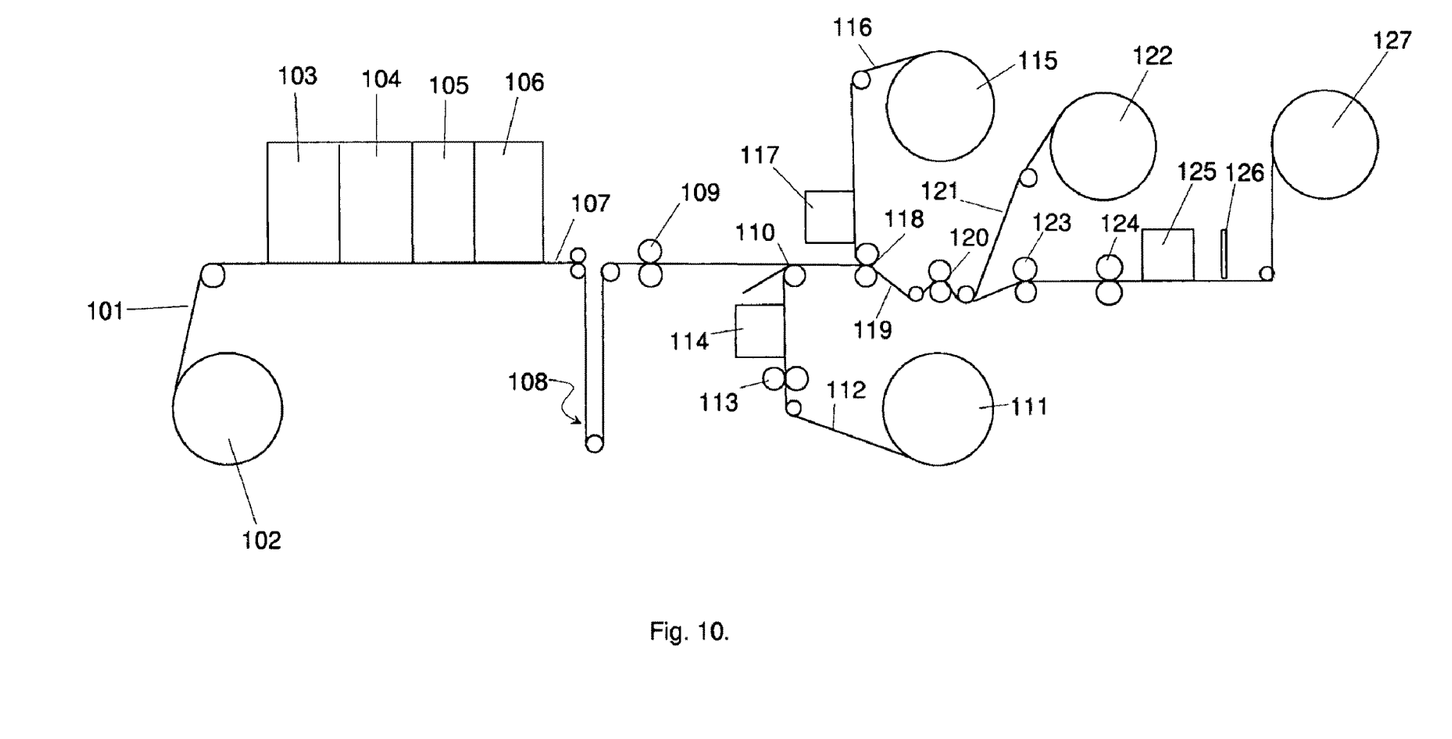
FIGS. 10 and 11 show schematic side views of possible process lines.

FIG. 10 shows one possible process line for smart labels. An impedance matching element web 101 comprises impedance matching elements one after the other on the surface of the web unwound from a roll 102. Adhesive for attaching an integrated circuit on a chip to the impedance matching element is dispensed in an adhesive unit 103. The adhesive can be for example an anisotropically conductive adhesive. The chip is attached to the impedance matching element in a chip attachment unit 104. The adhesive is cured in a curing unit 105. Thus, a structural module web 107 comprising sequential structural modules is formed. The structural module web 107 is tested for the functionality of the structural modules in a testing unit 106. After the testing unit 106 there is a buffer 108 which levels out possible speed differences between the left side and the right side of the process line. After the buffer 108 there is a slitting unit 109.

A face web 112 is unwound from a roll 111. The face web 112 can be for example a paper web. The face web 112 can be printed or blank. The antenna strip, i.e. the antenna, is formed in a printing unit 113. Another alternative is to attach an electrically conductive foil strip to the face web 112. After that, hot-melt adhesive is applied selectively (only the area in which the structural module is due to be applied is covered with the adhesive) onto the surface of the face web 112 in a hot-melt adhesive unit 114.

The individual structural modules are attached to the surface of the face web 112 in a dispensing unit 110 in which the sequential structural modules are separated from each other, i.e. the structural module web 107 is cut into individual structural modules. At the same time, the structural modules are tested and the poor ones are removed. A back web 116 is unwound from a roll 115. The back web 116 can be, for example a release liner. Hot-melt adhesive is applied onto the surface of the back web 116 in a hot-melt adhesive unit 117. Alternatively, it is possible that the hot-melt adhesive is applied to the whole area of the face web 112 in the hot-melt adhesive unit 114. In that case, the hot-melt adhesive unit 117 can be omitted. The face web 112 and the back web 116 are laminated together in a lamination nip 118 to form a smart label web 119. The smart label 119 is die-cut into individual smart labels in a die-cutting unit 120. The individual smart labels are on the surface of the back web 116, i.e. on the surface of the release liner. A trash web 121 is wound onto a roll 122.

The ready labels on the surface of the back web 116 are separated from each other in the cross-machine direction in a slitting unit 123. The ready labels travel through a main pull unit 124 to a tester 125 which tests the functionality of the transponders. At the end of the process line there is a printing unit 126, for example an ink-jet printing unit, for printing the labels. Finally, the back web 116 having printed labels on its surface, is wound to a roll 127.

One skilled in the art readily realizes that certain elements of the manufacturing line can be transposed. For example, the back web 116 and the face web 112 can be transposed. It is also clear that the hot-melt adhesive units can be replaced by the transfer lamination process.

The lamination of the antenna strip can also take place before the lamination of the structural module or preprinted materials can be used (a preprinted label face, a preprinted antenna strip).

Another possibility is that the label stock is purchased with the antenna strip already laminated during the manufacture of the label stock. The process may run as described above in the description of FIG. 10, but the printing unit 113 (or the antenna strip application unit) can be omitted.

Figure 11:
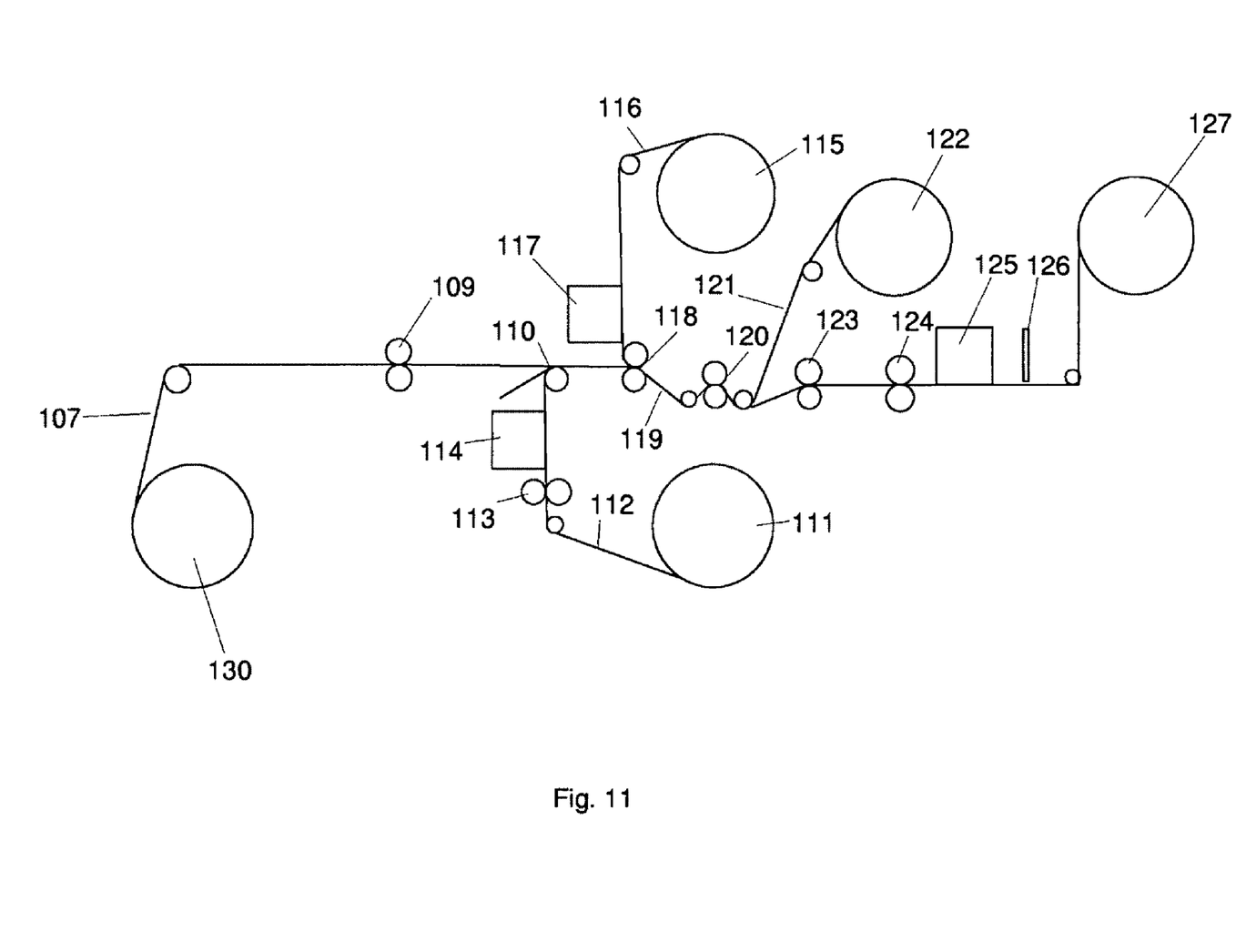

FIG. 11 shows another possible process line for smart labels. The process line is the same as in FIG. 10 except that the beginning of the process line is omitted. In that case the structural module web 107 has been manufactured on another process line and wound to a roll 130. The structural module web 107 is unwound from the roll 130 and led directly to the slitting unit 109.

In the following, a manufacturing process for package transponders will be described. In the package transponder manufacturing process, the key is also to improve the integration level of manufacturing (without a need to use inlays) and to utilize the capacitively connected structural module and metal strip antenna concept.

The process may run, for example, as follows: The structural module web, each structural module comprising an integrated circuit on a chip, is unwound from a roll. After that the structural modules are tested contactlessly. The structural module web is coated with an adhesive unless there is already for example a pressure sensitive adhesive. The structural module web is separated into individual structural modules, and these are dispensed on a package substrate. However, such modules which have not passed the test are not dispensed.

A metal strip web is unwound from a roll. The metal strip web is coated with an adhesive unless it is already provided with an adhesive. The strip is laminated on top of a package and cut to a correct electrical length. Another alternative is to print the strip on the package material. Finally, the ready transponder is tested for functionality. It is also possible that the lamination of the antenna strip takes place before the lamination of the structural module.

Another possibility is that the box material is purchased with antenna strip already laminated during the manufacture of the raw material. In this case, the process may run as follows:

A structural module web, each structural module comprising an integrated circuit on a chip, is unwound from a roll. The structural module web is coated with an adhesive unless it is already provided with an adhesive. The structural module web is separated into individual structural modules and these are dispensed on a package substrate. However, such modules which have not passed the test are not dispensed. The strip may be cut to the correct electrical length prior to or after applying on the box material. At the end of the process line, the transponders are tested for functionality.

In the following, a discrete manufacturing process for label converting will be described. The discrete process means that the structural modules are manufactured in a process different from the structural module assembly and the strip antenna manufacturing onto the package. Structural modules are manufactured with similar equipment as in above processes. The process may run, for example, in the following way:

A web comprising impedance matching elements one after the other on the surface of the web, is unwound from a roll. Next, integrated circuits on chips are assembled onto the web. The web is coated with an adhesive and a release liner is laminated onto the web. After that the web is slit. In the following step, the structural modules are tested in a contactless manner, and those structural modules which do not function property are marked. The web is wound to a roll.

In a separate process line, the web is unwound and cut to individual structural modules. The properly functioning individual structural modules are attached to a face web. The antenna strip is laminated onto the label substrate and cut to a correct electrical length, or the antenna strip is printed. After that the transponders are tested electrically, and those transponders which do not function properly are marked.

The lamination or printing of the antenna strip may also take place before the dispensing of the structural module. Preprinted materials can also be used (a preprinted label face, a preprinted antenna strip). A label stock in which the antenna strip has been prelaminated during the manufacture of the label stock, can also be used.

In the following, a discrete process for manufacturing a package will be disclosed. The discrete process means that the structural modules are manufactured in a process different from the structural module assembly and the label converting. The structural modules are manufactured with equipment similar to those in the above processes. The process runs almost in the same way as the discrete manufacturing process for label converting, but the face web is replaced by a package surface.

The lamination or printing of the antenna strip can also take place before the dispensing of the structural module. Preprinted materials can also be used (a preprinted label face, a preprinted antenna strip). A label stock in which the antenna strip has been prelaminated during the manufacture of the label stock, can also be used.

In all of the above processes in which the cutting of a metal strip into the correct electrical length has been mentioned, the cutting can be performed by normal die-cutting or by perforation or by means of a cutting tool. When the electrical length of the tag can be adjusted online during the processing, it means that tag can be mass tailored to the specific application at the very end of its manufacture, since the electrical length of the antenna defines the intermediate materials in which the tag functions. In prior art methods of producing tags, the electrical length of the tag and thereby also the applications in which it functions are determined when the antenna is manufactured or printed. This new innovation enables manufacturing on demand, without high investments on predefined and refined material.

Furthermore, the investments on the manufacturing equipment are low, especially if the structural module is purchased and dispensed and an antenna strip is used.

In both of the discrete processes, the coating of the adhesive and the lamination of the release liner onto the structural module can also take place before the assembly of the IC onto the structural module. In this case, the IC is assembled onto a PSA structural module.

Especially in discrete label or package manufacturing, also prefabricated laminated and die-cut antenna strip labels can be used. This will then mean that both the structural module and the antenna strip part are of the PSA type and are dispensed on top of the label or package substrate during the manufacture of the package or label.

The invention claimed is:

1. A method for manufacturing products comprising transponders, comprising:
    introducing a web including structural modules spaced a first distance between each other on a surface of the web, wherein a structural module comprises
    an impedance matching element comprising loops, and
    an integrated circuit electrically connected to the impedance matching element,
    attaching the integrated circuit to the impedance matching element via at least a bump so a loop is activated when a bump is attached to the loop,
    cutting the web in such a manner that structural modules are separated,
    attaching the structural modules to a substrate, the structural modules having a second distance between each other, the second distance being longer than the first distance, and
    attaching the impedance matching elements to antennas so that the impedance matching elements and the antennas form an electrical connection.

2. The method according to claim 1, further comprises:
    arranging the structural modules next to each other in the cross direction of the web, the structural modules having a first cross-directional distance between each other, and
    attaching the structural modules to a product substrate, the structural modules having a second cross-directional distance between each other, the second cross-directional distance being longer than the first cross-directional distance.

3. The method according to claim 1 further comprising forming the electrical connection as a capacitive connection.

4. The method according to claim 1 further comprising forming the electrical connection as an ohmic connection.

5. The method according to claim 1, further comprising forming the impedance matching element by at least one of etching or printing.

6. The method according to claim 1, wherein the integrated circuit is on a silicon chip and further comprising attaching the chip to the impedance matching element by anisotropically conductive adhesive.

7. The method according to claim 1 wherein the integrated circuit is on a polymeric chip and further comprising printing the polymeric chip together with the impedance matching element so as to form a part of the structural module.

8. The method according to claim 7, further comprising capacitively connecting the structural module to the antenna.

9. The method according to claim 7, further comprising forming an ohmic contact between a structural module and an antenna using an electrically conductive paste.

10. The method according to claim 1, further comprising printing the antenna using an electrically conductive ink.

11. The method according to claim 1, further comprising forming the antenna using a metallic foil.

12. The method according to claim 1, wherein the product substrate comprises a web form.

13. The method according claim 1, wherein the impedance matching element comprises a primary loop and a secondary loop, and further comprising attaching the integrated circuit on the chip to the impedance matching element via at least two bumps so that the primary loop is activated when a bump is attached to the primary loopn and the secondary loop is activated when a bump is attached to the secondary loop.

14. The method according to claim 1, further comprising forming the impedance matching elements on the surface of the web before attaching the chips to the web.

15. The method according to claim 1, further comprising testing the structural modules tested, and removing inoperative structural modules before attaching the structural modules to the substrate.

* * * * *